(12) United States Patent
Quenzer

(10) Patent No.: US 11,254,173 B2
(45) Date of Patent: Feb. 22, 2022

(54) TIRE PRESSURE MONITORING SYSTEM

(71) Applicant: Trek Bicycle Corporation, Waterloo, WI (US)

(72) Inventor: Jon Quenzer, German Valley, IL (US)

(73) Assignee: Trek Bicycle Corporation, Waterloo, WI (US)

( * ) Notice: Subject to any disclaimer, the term of this patent is extended or adjusted under 35 U.S.C. 154(b) by 0 days.

(21) Appl. No.: 16/822,678

(22) Filed: Mar. 18, 2020

(65) Prior Publication Data

US 2020/0298633 A1   Sep. 24, 2020

Related U.S. Application Data

(60) Provisional application No. 62/820,310, filed on Mar. 19, 2019.

(51) Int. Cl.
*B60C 23/00* (2006.01)
*B60C 23/04* (2006.01)

(52) U.S. Cl.
CPC ........ *B60C 23/0435* (2013.01); *B60C 23/041* (2013.01); *B60C 2200/12* (2013.01)

(58) Field of Classification Search
CPC ................................................. B60C 23/0435
See application file for complete search history.

(56) References Cited

U.S. PATENT DOCUMENTS

| 5,790,016 A | * | 8/1998 | Konchin | G01D 5/2073 340/442 |
| 6,124,787 A | * | 9/2000 | Isakov | G01D 5/2073 340/442 |
| 2019/0001763 A1 | | 1/2019 | Jordan et al. | |
| 2019/0001765 A1 | * | 1/2019 | Jordan | B60C 23/006 |

FOREIGN PATENT DOCUMENTS

CN   201736748 U   2/2011

* cited by examiner

*Primary Examiner* — Qutbuddin Ghulamali
(74) *Attorney, Agent, or Firm* — Bell & Manning, LLC; Christopher Kalafut

(57) ABSTRACT

A tire pressure monitor includes a printed circuit board (PCB) and a sealed pressure chamber mounted to the PCB. The tire pressure monitor also includes a piston mounted adjacent to the sealed pressure chamber. The piston is configured to contact the sealed pressure chamber in response to an applied pressure. The tire pressure monitor also includes a liquid within the sealed pressure chamber. Translation of the piston causes the liquid to apply pressure to a pressure sensor. The pressure sensor is mounted within the sealed pressure chamber, and is configured to detect the applied pressure.

20 Claims, 8 Drawing Sheets

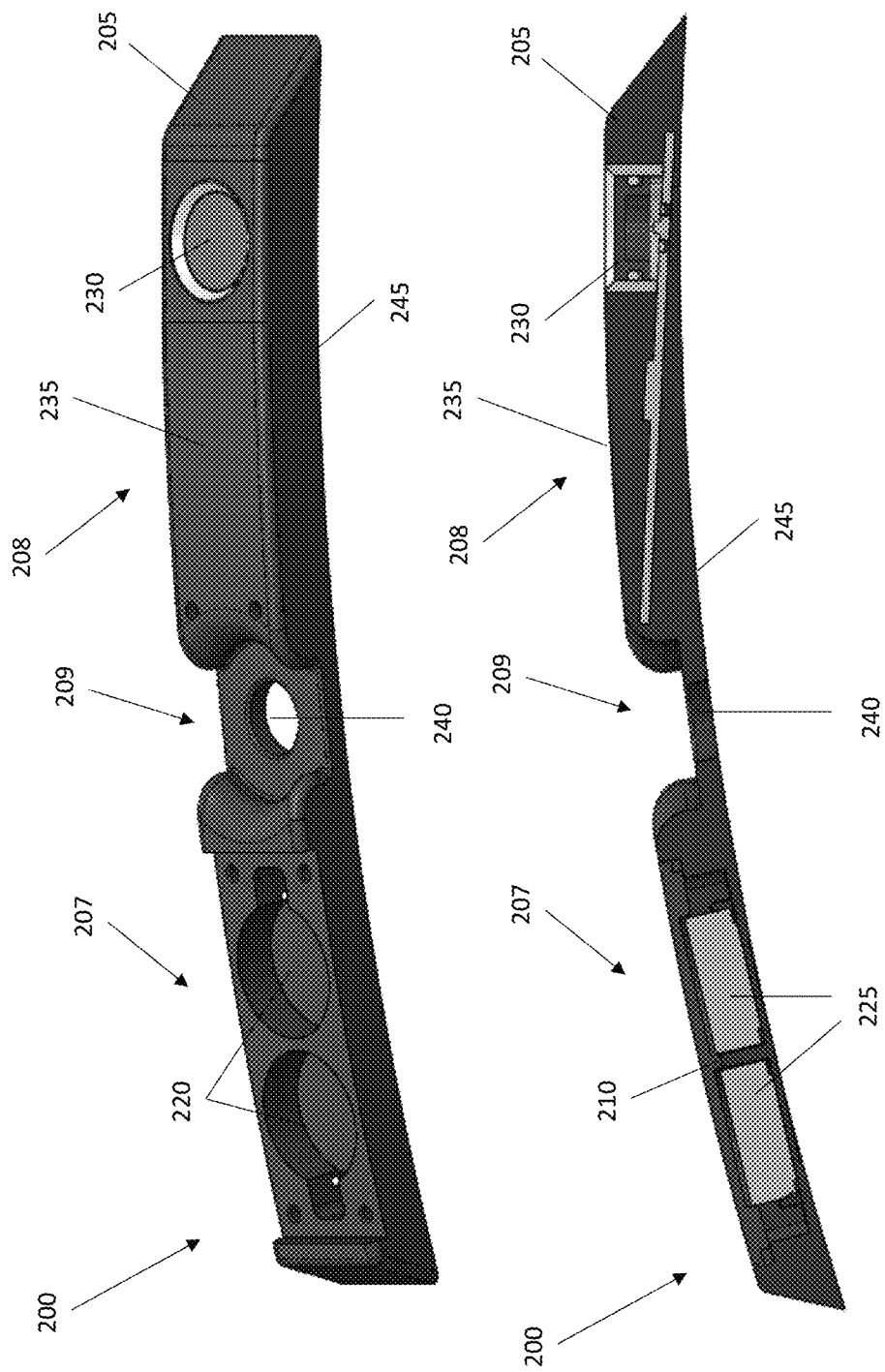

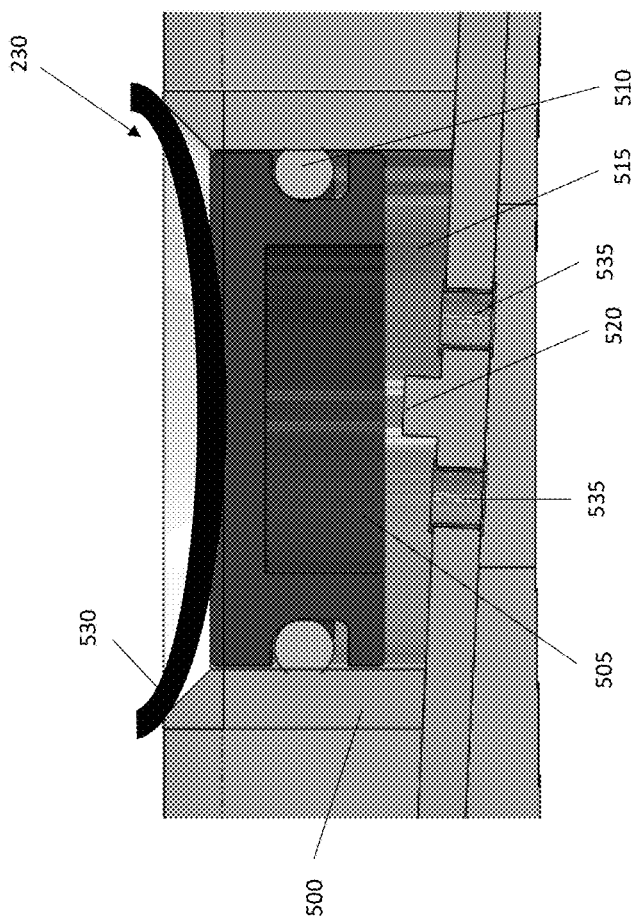
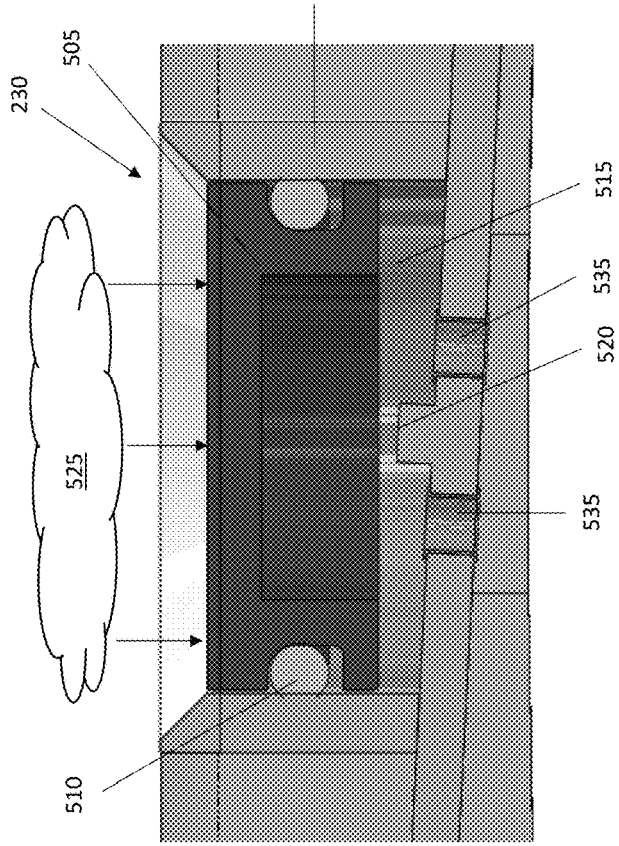

TIRE PRESSURE MONITORING SYSTEM

CROSS-REFERENCE TO RELATED APPLICATION

The present application claims the priority benefit of U.S. Provisional Patent App. No. 62/820,310 filed on Mar. 19, 2019, the entire disclosure of which is incorporated by reference herein.

BACKGROUND

The air pressure in bicycle tires is an important aspect of the bicycle that can affect rider comfort, cycling efficiency, tire life, and safety. Different types and sizes of bicycle tires often require different amounts of air pressure to provide optimal performance. Once the bicycle tire has the appropriate amount of air pressure, it is desirable for the rider to monitor the air pressure over time to detect changes that might occur due to a slow leak, a temperature change, a large impact, etc. Traditional tire pressure gauges for monitoring air pressure are designed to temporarily mount to (or rest upon) a valve stem of the tire. As it is placed into position, the air pressure gauge depresses the air release in the valve stem such that the internal air pressure is detected by a sensor and presented to the rider.

SUMMARY

An illustrative tire pressure monitor includes a printed circuit board (PCB) and a sealed pressure chamber mounted to the PCB. The tire pressure monitor also includes a piston mounted adjacent to the sealed pressure chamber. The piston is configured to contact the sealed pressure chamber in response to an applied pressure. The tire pressure monitor also includes a liquid within the sealed pressure chamber. Translation of the piston causes the liquid to apply pressure to a pressure sensor. The pressure sensor is mounted within the sealed pressure chamber, and is configured to detect the applied pressure.

An illustrative method of forming a tire pressure monitor includes mounting a base of a chamber to a printed circuit board (PCB) such that the base is positioned over a first opening and a second opening in the PCB. The base includes a pressure sensor. The method also includes placing a liquid into the chamber via at least the first opening in the PCB. The method also includes sealing the first opening and the second opening in the PCB to form a sealed pressure chamber. The method further includes mounting a piston adjacent to the sealed pressure chamber such that the piston contacts the sealed pressure chamber in response to an applied pressure on the piston.

Other principal features and advantages of the invention will become apparent to those skilled in the art upon review of the following drawings, the detailed description, and the appended claims.

BRIEF DESCRIPTION OF THE DRAWINGS

Illustrative embodiments will hereafter be described with reference to the accompanying drawings, wherein like numerals denote like elements. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 2B is a perspective view of the tire pressure monitor with the battery cover removed in accordance with an illustrative embodiment.

FIG. 2C is a cross-sectional view of the tire pressure monitor in accordance with an illustrative embodiment.

FIG. 5A is a cross-sectional view of the pressure sensor system in use as a tubeless tire sensor in accordance with an illustrative embodiment.

FIG. 5B is a cross-sectional view of the pressure sensor system in use as a tubed tire sensor in accordance with an illustrative embodiment.

DETAILED DESCRIPTION

Traditional tire pressure monitoring systems involve manual rider interaction each time the rider wishes to check his/her bicycle tires. Specifically, the rider must obtain an air pressure gauge, unscrew the cap from the valve stem of each bicycle tire, mount the gauge to each tire to receive an analog or digital readout of the tire pressure, remove the gauge, and replace the valve stem caps. Additionally, the rider must determine whether the detected air pressure values are within an acceptable range for the given tires, and take any action accordingly to ensure that the air pressure is optimal. This time consuming process can potentially discourage riders from checking their tire pressure as often as they should.

Described herein are methods and systems for automated tire pressure monitoring that significantly reduce the amount of time and effort that it takes for a rider to determine whether his/her tire pressure is good. The proposed tire pressure monitor mounts internal to the bicycle tire and uses wireless transmission technology to send pressure readings to a user device (e.g., smartphone, tablet, smartwatch, etc.) and/or to a bicycle computer system. In one embodiment, the automated tire pressure monitoring system utilizes a sensor embedded within a sealed pressure chamber to monitor the air pressure. The sealed pressure chamber can be filled with a liquid, such as an oil, whose volume does not significantly change under pressure or with temperature. As a result, the proposed tire pressure monitoring system can be used in both cold and hot climates.

Figure 1:
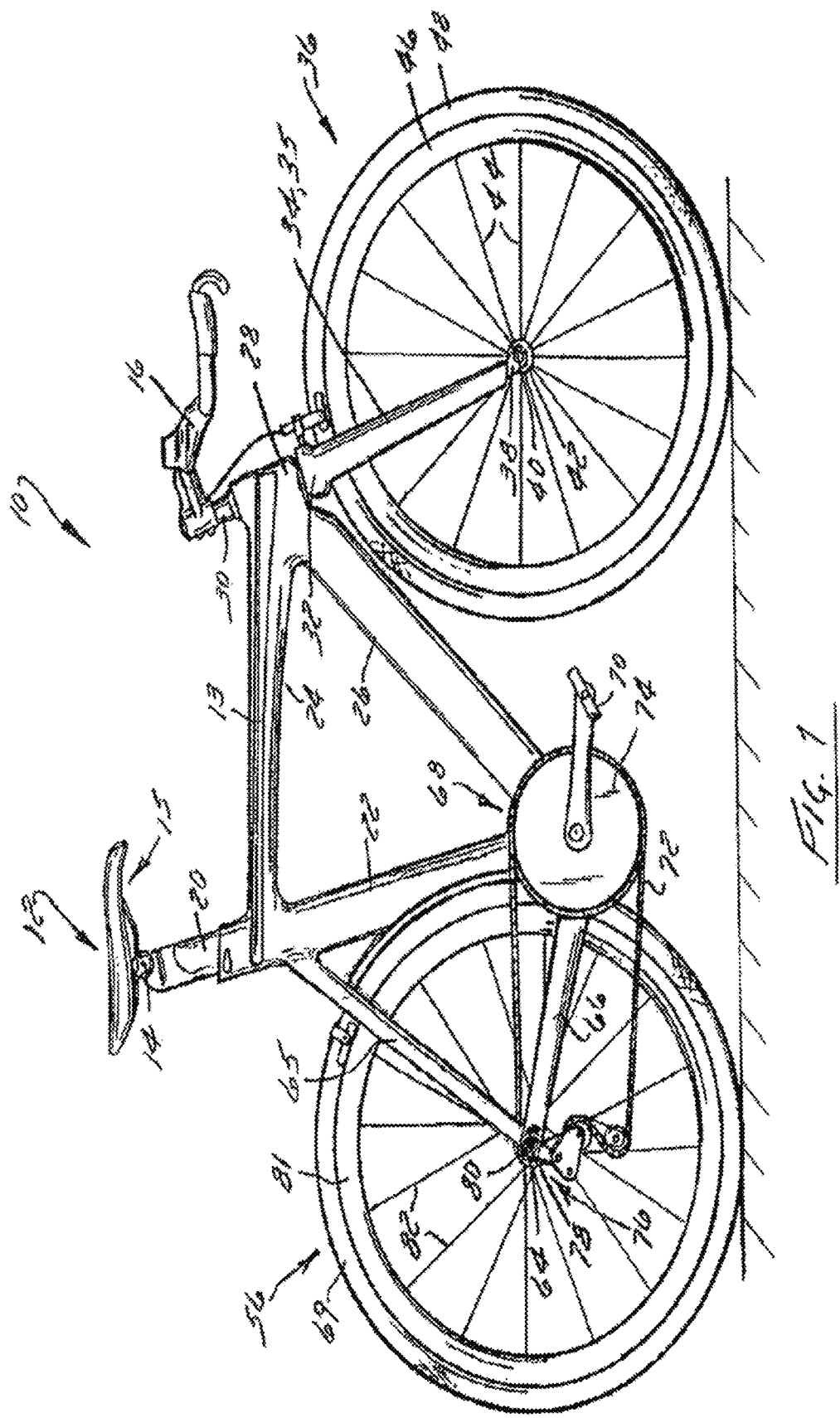
FIG. 1 shows a bicycle that includes a tire pressure monitoring system in accordance with the embodiments described herein.

FIG. 1 shows a bicycle 10 that includes a tire pressure monitoring system in accordance with the embodiments described herein. The bicycle 10 includes a frame 13 to which a seat assembly 12 and handlebars 16 are attached. A seat clamp 14 is engaged with an underside 15 of seat assembly 12 and cooperates with a seat post 20 that slidably engages a seat tube 22 of frame 13. A top tube 24 and a down tube 26 extend forwardly from seat tube 22 to a head tube 28 of frame 13.

Handlebars 16 are connected to a steerer tube 30 that passes through head tube 28 and engages a fork crown 32. A pair of forks 34, 35 extend from generally opposite ends of fork crown 32 and are constructed to support a front wheel assembly 36 at an end thereof or fork tip 38. Fork tips 38 engage generally opposite sides of an axle 40 that is constructed to engage a hub 42 of front wheel assembly 36. A number of spokes 44 extend from hub 42 to a rim 46 of front wheel assembly 36. A tire 48 is engaged with rim 46 such that rotation of tire 48, relative to forks 34, rotates rim 46 and hub 42.

A rear wheel assembly 56 is positioned generally concentrically about a rear axle 64. A seat stay 65 and a chain stay 66 offset rear axle 64 from a crankset 68. Crankset 68 includes pedals 70 that are operationally connected to a flexible drive such as a chain 72 via a chain ring or sprocket 74. Rotation of chain 72 communicates a drive force to a rear section 76 of bicycle 10 having a gear cluster 78 positioned thereat. Gear cluster 78 is generally concentrically orientated with respect to rear axle 64 and includes a number of variable diameter gears.

Gear cluster 78 is operationally connected to a hub 80 associated with a rear tire 69 of rear wheel assembly 56. A number of spokes 82 extend radially between hub 80 and a rim 81 that supports tire 69 of rear wheel assembly 56. As is commonly understood, rider operation of pedals 70 drives chain 72 thereby driving rear tire 69 which in turn propels bicycle 10. The bicycle 10 can be provided in any of a road bicycle, mountain bicycle, off-road bicycle, trail bicycle, etc. configuration. A tire pressure monitor can be mounted within the tire 48 and within the tire 69 such that the air pressure is monitored in both tires of the bicycle 10. As discussed herein, the tires can be tubed or tubeless as the proposed sensor system works in both types of tires.

Figure 2A:
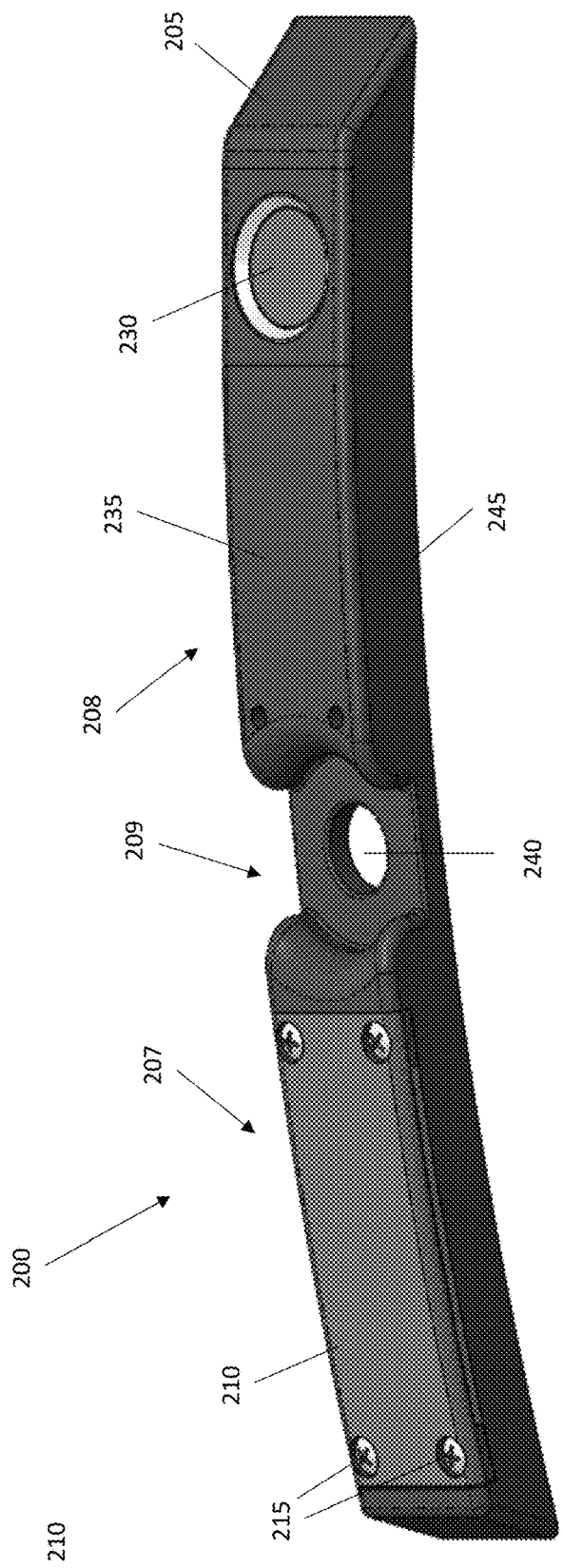
FIG. 2A is a perspective view of a tire pressure monitor in accordance with an illustrative embodiment.

FIG. 2A is a perspective view of a tire pressure monitor 200 in accordance with an illustrative embodiment. FIG. 2B is a perspective view of the tire pressure monitor 200 with the battery cover removed in accordance with an illustrative embodiment. FIG. 2C is a cross-sectional view of the tire pressure monitor 200 in accordance with an illustrative embodiment. The tire pressure monitor 200 includes a housing 205, and each component of the tire pressure monitor 200 is stored within or mounted to the housing 205. The housing 205 encases and seals the components of the tire pressure monitor 200, protecting them from the environment. In an illustrative embodiment, the housing 205 is made of a plastic or other non-conductive material such as rubber. The material used to make the housing 205 can be at least partially flexible in some embodiments. The housing 205 can be formed using a low pressure injection molding process, three-dimensional (3D) printing, a different molding process, etc.

The housing 205 includes a battery portion 207 and a sensor portion 208, which are separated by a mounting portion 209. The battery portion 207 of the housing 205 houses the power supply for the unit and includes a battery cover 210 that is secured to the main body of the housing 205 using fasteners 215. Alternatively, a different attachment mechanism than the fasteners 215 may be used, such as clips, male/female connections, etc. to secure the battery cover 210 to the main body. The battery cover 210 is used to cover battery receptacles 220, each of which is designed to hold a battery 225. Although 2 batteries 225 are shown, the tire pressure monitor 200 can include fewer or additional batteries in alternative embodiments, such as 1, 3, 5, etc.

The sensor portion 208 of the housing 205 contains a pressure sensor system 230 and other electronics, as described in more detail below. Access to the interior of the sensor portion 208 is through an electronics cover 235, that can be secured to the housing 205 using fasteners, clips, male/female connections, etc. As shown, the electronics cover 235 covers electronics adjacent to the pressure sensor system 230, but does not surround the pressure sensor system 230 itself. Rather, the pressure sensor system 230 is surrounded and held in place by an integral portion of the housing 205 that is separate from the electronics cover 235. In an alternative embodiment, the electronics cover 235 can be used to surround and help secure the pressure sensor system 230.

The battery portion 207 and the sensor portion 208 are both adjacent to the mounting portion 209 of the housing 205. As shown, the mounting portion 209 includes an opening 240. The opening 240, which can be circular or another shape, is designed to receive a portion of a valve stem of a bicycle tire, and the valve stem secures the tire pressure monitor 200 to the rim as discussed in more detail below. As shown, the edge of the battery portion 207 that is adjacent to the opening 240 is rounded to accommodate the valve stem. Similarly, the edge of the sensor portion 208 this adjacent to the opening 240 is also rounded to accommodate the valve stem. The outer ends of the battery portion 207 and the sensor portion 208 are tapered to improve aerodynamics and to reduce weight of the monitor. Additionally, as shown, a bottom edge 245 of housing 205 is curved to match a curvature of a rim onto which the tire pressure monitor 200 is to be mounted. In one embodiment, the housing 205 can be flexible and the bottom edge 245 can be formed to have a desired amount of curvature such that the tire pressure monitor 200 can be used on rims have different radii of curvature.

Figure 3A:
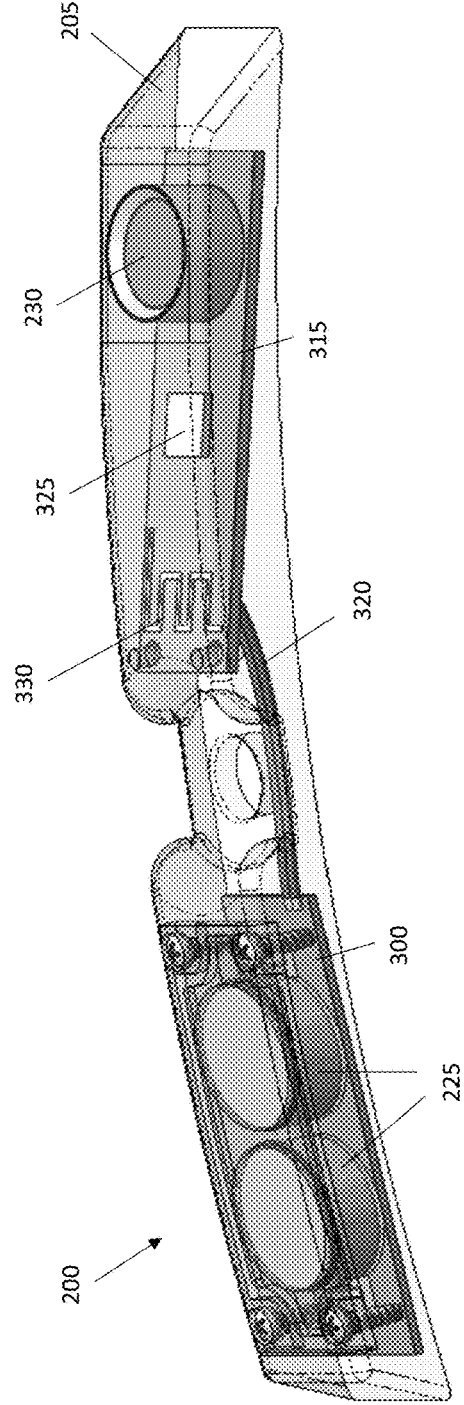
FIG. 3A is a perspective view of the tire pressure monitor with the housing made partially transparent in accordance with an illustrative embodiment.
Figure 3B:
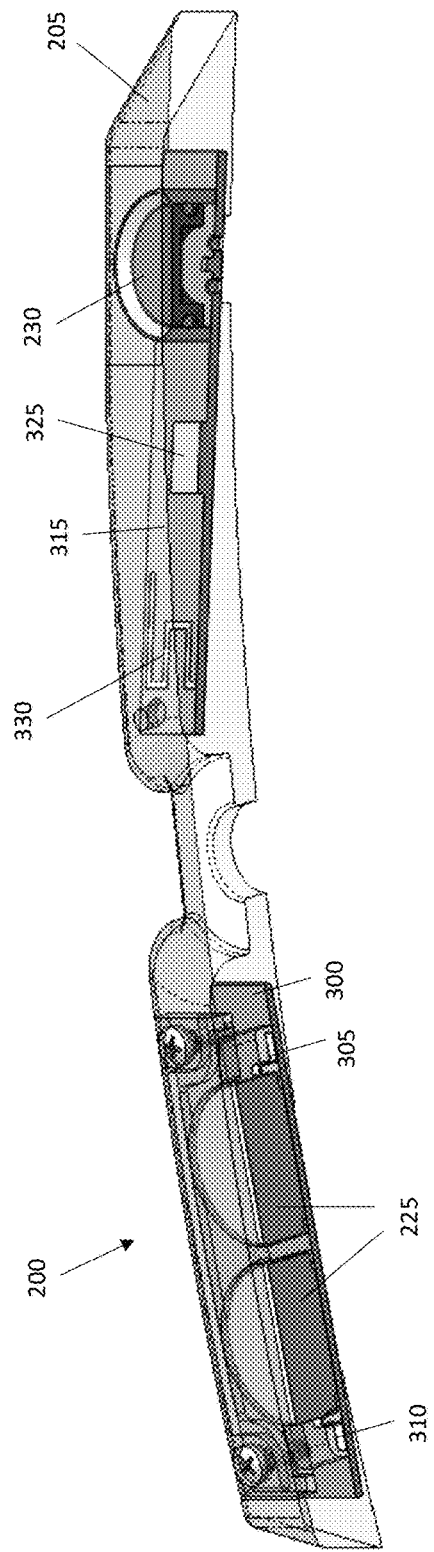
FIG. 3B is a cross-sectional view of the tire pressure monitor with the housing made partially transparent in accordance with an illustrative embodiment.

FIG. 3A is a perspective view of the tire pressure monitor 200 with the housing 205 made partially transparent in accordance with an illustrative embodiment. FIG. 3B is a cross-sectional view of the tire pressure monitor 200 with the housing 205 made partially transparent in accordance with an illustrative embodiment. As shown, the batteries 225 are mounted to a first printed circuit board 300 that is mounted within the battery portion 207 of the housing 205. The first printed circuit board 300 can be mounted within the housing 205 using one or more fasteners, an adhesive, clips, friction fit, etc. The batteries 225 are connected to the first printed circuit board 300 via a first battery lead 305 and a second battery lead 310. Alternatively, the battery leads can be underneath the batteries 225 on the first circuit board 300. In an illustrative embodiment, the battery cover 210, when mounted, can be used to hold the batteries 225 in place. The batteries are used to provide power to all of the electronic components of the tire pressure monitor 200.

The first printed circuit board 300 is connected to a second printed circuit board 315 via wires 320. The wires 320 can be used to deliver power from the batteries to the pressure sensor system 230 and to an electronics unit 325 mounted to the second printed circuit board 315. The second printed circuit board 315 is mounted within the sensor portion 208 of the housing 205, and can be mounted via one or more fasteners, friction fit, clips, an adhesive etc. The electronics unit 325 can include an accelerometer to detect and monitor tire acceleration. The electronics unit 325 can also include a microprocessor, microcontroller, or other component to obtain readings from the accelerometer and the pressure sensor system 230. In some embodiments, the electronics unit 325 can include a memory or other storage system to store operating instructions, sensor readings, etc. The second printed circuit board 315 also includes an antenna 330 such that sensor readings and other data can be wirelessly transmitted to a receiving device, such as a user computing device, a central server, or a bicycle computer. The electronics unit 325 includes a transceiver that is designed to use the antenna 330 to send and/or receive information. Received information can include operating instructions, software updates, etc. In an alternative embodiment, the electronics unit 325 of the tire pressure monitor 200 may include only a transmitter, and the antenna 330 may be used only to send detected pressure and acceleration data.

Figure 4:
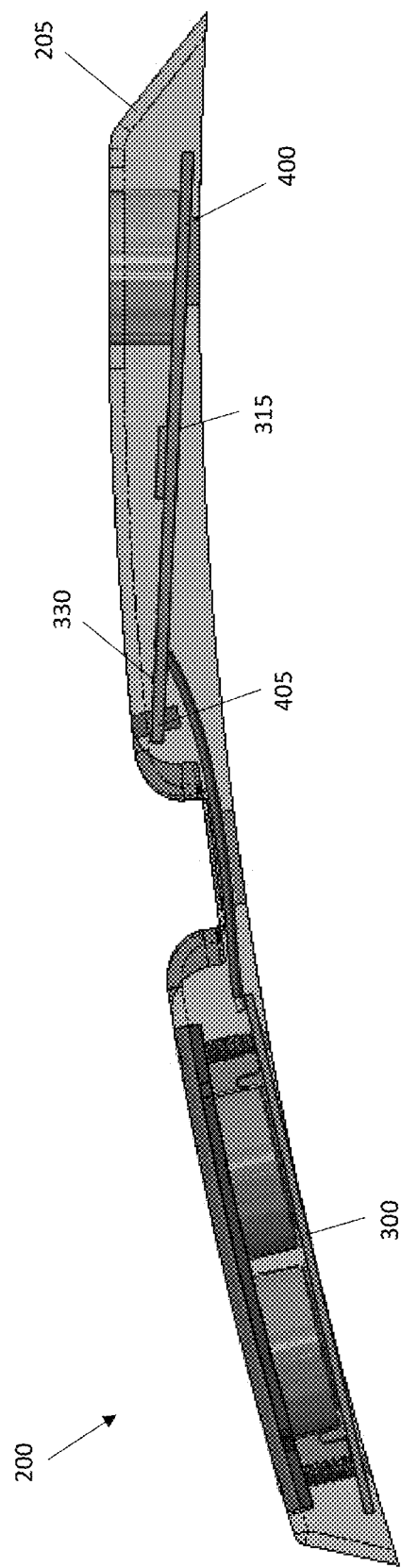
FIG. 4 is a cross-sectional view of the tire pressure monitor that depicts an antenna mounting configuration in accordance with an illustrative embodiment.

In an illustrative embodiment, the antenna 330 of the tire pressure monitor 200 is mounted in the housing 205 such that the antenna is positioned a maximal distance away from the bicycle rim. Such positioning will help to reduce signal interference caused by the rim to which the sensor is mounted. FIG. 4 is a cross-sectional view of the tire pressure monitor 200 that depicts an antenna mounting configuration in accordance with an illustrative embodiment. As shown, the first printed circuit board 300 is mounted such that it is substantially flat on the interior bottom surface of the housing 205. However, the second printed circuit board 315 is mounted such that a first end 400 of the second printed circuit board 315 is mounted to the interior bottom surface of the housing 205 and a second end 405 of the second printed circuit board 315 is mounted to an inner surface of the top cover of the housing 205. In one embodiment, the second end 405 of the second printed circuit board 315 is mounted to the electronics cover 235 and/or to a fastener that is used to secure the electronics cover 235 to the housing 205. Alternatively, the second end 405 may be mounted to a different portion of the inner surface of the top cover of the housing 205 and/or to a tab that extends from the inner surface of the top cover.

Thus, as shown, the second end 405 of the second printed circuit board 315 is substantially elevated off of the bottom wall of the housing 205. Since the bottom wall of the housing 205 is the closest portion of the tire pressure monitor 200 to the rim, the elevation of the second end 405 positions the antenna 330 a distance away from the rim, which improves antenna performance. In an alternative embodiment, the antenna may be mounted elsewhere within the tire pressure monitor. As also shown in FIG. 5, this mounting configuration results in the pressure sensor system 230 being mounted at an angle.

FIG. 5A is a cross-sectional view of the pressure sensor system 230 in use as a tubeless tire sensor in accordance with an illustrative embodiment. FIG. 5B is a cross-sectional view of the pressure sensor system 230 in use as a tubed tire sensor in accordance with an illustrative embodiment. As shown, the pressure sensor system 230 includes a housing 500 that contains a piston 505. An o-ring 510 is used to mount the piston 505 within the housing 500. The pressure sensor system 230 also includes a sealed pressure chamber 515 positioned adjacent to the piston 505. The sealed pressure chamber 515 is filled with a liquid and includes a pressure sensor 520, such as a micro-electrical-mechanical system (MEMS) pressure sensor. Alternatively, a different type of sensor may be used.

As shown in FIG. 5A, air pressure 525 from within the tire presses down on the piston 505, which in turn pushes down on the sealed pressure chamber 515. The pressure applied to the sealed pressure chamber 515 results in a pressure being applied to the pressure sensor 520, which is sensed as the air pressure of the tubeless tire. Because the sealed pressure chamber 515 is filled with a liquid, the volume of the chamber does not change even though it is being compressed. In an illustrative embodiment, the liquid is an oil such as a dielectric oil (e.g., silicon oil). Dielectric oil does not freeze at standard operating temperatures of a bicycle, and therefore can be used in both cold and hot climates. Alternatively, a different type of liquid may be used.

As shown in FIG. 5B, air pressure from within a tube 530 of the tire causes the tube to press down on the piston 505, which in turn pushes down on the sealed pressure chamber 515. Specifically, the pressure within the tire causes the tube 530 to conform around the exposed portion of the piston 505 of the pressure sensor system 230. The pressure applied to the sealed pressure chamber 515 from the piston 505 results in a pressure being applied to the pressure sensor 520, which is sensed as the air pressure of the tubed tire.

As discussed above, the mounting configuration of the second printed circuit board to elevate the antenna away from the rim results in the pressure sensor system 230 being mounted at an angle. Since the top edge of the pressure sensor system 230 is parallel to the top edge of the housing 205, this angled configuration of the pressure sensor system 230 results in the sealed pressure chamber 515 having a varying depth along its cross-sectional diameter. Specifically, as shown in FIGS. 5A and 5B, the leftmost edge of the sealed pressure chamber 515 has less depth than the rightmost edge thereof.

In one embodiment, a base of the sealed pressure chamber 515 of the pressure sensor system 230 can be made from a nickel plated metal. Alternatively, a different type of metal and/or coating may be used. If the base of the sealed pressure chamber 515 is made from metal, the chamber can be soldered to the second printed circuit board to create an airtight, watertight seal between the base of the sealed pressure chamber 515 and the second printed circuit board. Alternatively, the base of the sealed pressure chamber 515 may be made from a plastic, and in such an embodiment it can be epoxied or glued to form a seal between the base of the chamber and the second printed circuit board.

Figure 5C:
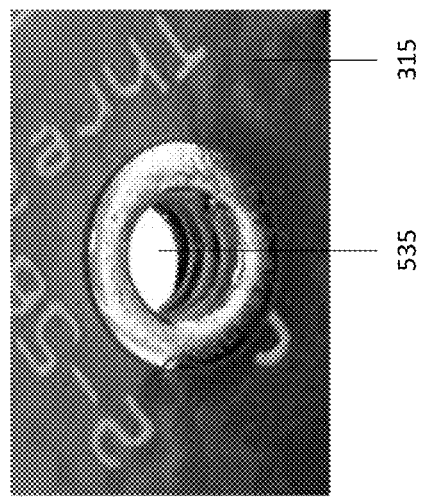
FIG. 5C is a close-up view of one of the openings in the second printed circuit board in accordance with an illustrative embodiment.

Once the base of the sealed pressure chamber 515 is mounted to the printed circuit board, the base can be filled with the liquid and sealed. As shown in FIGS. 5A and 5B, a pair of openings 535 extend through the second printed circuit board, and into the base of the sealed pressure chamber 515. In one embodiment, the pressure chamber does not include a bottom, and the bottom of the chamber is formed by the printed circuit board to which the chamber is mounted. Alternatively, the pressure chamber may include a bottom. A first of the openings 535 is designed to receive the liquid that is to fill the sealed pressure chamber 515. As discussed herein, the liquid can be a dielectric oil such as silicon oil, another type of oil, another type of liquid, etc. A second of the openings 535 is designed to allow air to escape (i.e., vent) from the chamber as the liquid is being introduced. Once the chamber is filled with liquid, the openings 535 are sealed using plugs, which can be formed from solder, a potting compound, hotmelt, adhesive, etc. FIG. 5C is a close-up view of one of the openings 535 in the second printed circuit board 315 in accordance with an illustrative embodiment.

Figure 6:
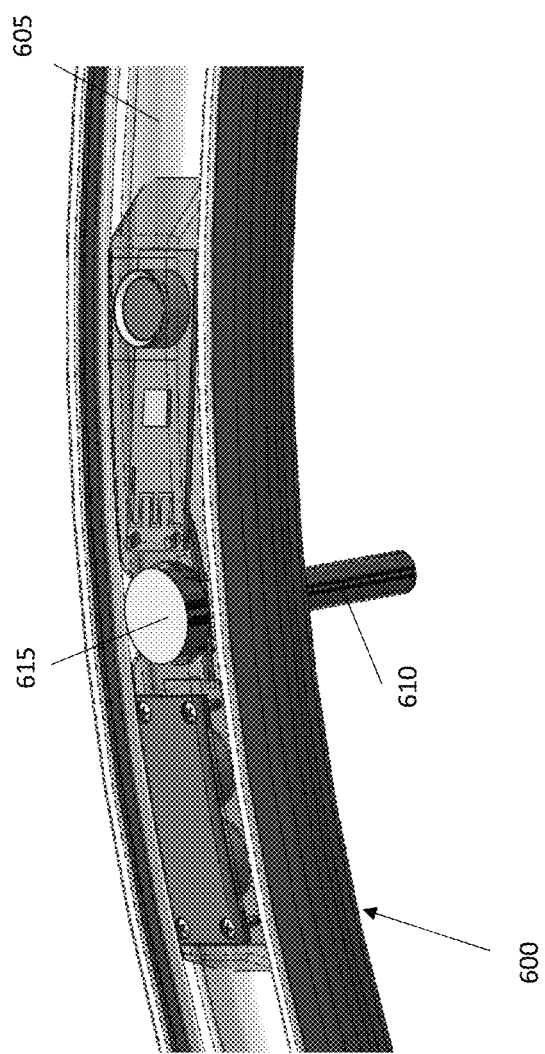
FIG. 6 is a sectional view of the tire pressure monitor mounted to a tubeless tire in accordance with an illustrative embodiment.

FIG. 6 is a sectional view of the tire pressure monitor 200 mounted to a tubeless tire 600 in accordance with an illustrative embodiment. The tubeless tire 600 includes a rim 605, and the tire pressure monitor 200 is mounted with a cavity of the rim 605. Specifically, a valve stem 610 of the rim 605 extends through a top side of the opening 240 in the mounting portion 209 of the housing 200 of the tire pressure monitor 200, through the bottom side of the opening 240, through a standard aligned opening in the rim, and into the interior portion of the wheel (i.e., proximate to the spokes) such that the valve stem 610 can be accessed by a rider to inflate/deflate the tubeless tire 600. As shown, a base 615 of the valve stem 610 does not fit through the opening 240 in the mounting portion 209 of the tire pressure monitor 200. As such, the valve stem 610 secures the tire pressure monitor 200 to the rim 605. The valve stem 610 can be secured to interior portion of the wheel using a fastener, solder, weld, adhesive, and/or any other techniques known in the art. As discussed herein, the proposed tire pressure monitor 200 can similarly be mounted and used in a tubed tire.

Thus, the proposed tire pressure monitor uses a liquid-filled sealed pressure chamber to detect actual air pressure within a tubeless tire or pressure exerted by the tube in a tubed bicycle tire. Upon being sensed, pressure values can be wirelessly provided to a computing device or to an application installed on a computing device. The computing device, which can be an integrated bicycle computer, a cell phone, a smartwatch, a tablet, a laptop, etc., can include a memory, processor, transceiver, and user interface, and can be used to wirelessly communicate with the tire pressure sensor 200. In some embodiments, an application on the computing device can process the received pressure data and can activate an alarm or otherwise notify the user (e.g., send a message to the user) that his/her tire pressure needs to be adjusted. In some embodiments, the computing device can also send instructions to the tire pressure monitor such as software updates, a frequency with which to test for pressure, a location at which to transmit the sensed data, etc.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A tire pressure monitor comprising:
   a printed circuit board (PCB);
   a sealed pressure chamber mounted to the PCB;
   a piston mounted adjacent to the sealed pressure chamber, wherein the piston is configured to contact an exterior surface of the sealed pressure chamber in response to an applied pressure;
   a liquid within the sealed pressure chamber, wherein translation of the piston causes the liquid to apply pressure to a pressure sensor; and
   the pressure sensor mounted within the sealed pressure chamber, wherein the pressure sensor is configured to detect the applied pressure.

2. The tire pressure monitor system of claim 1, wherein the pressure sensor comprises a micro-electro-mechanical systems (MEMS) pressure sensor.

3. The tire pressure monitor system of claim 1, wherein the liquid comprises a dielectric oil.

4. The tire pressure monitor system of claim 1, further comprising a housing that contains the PCB and at least a portion of the sealed pressure chamber.

5. The tire pressure monitor system of claim 1, further comprising a first PCB to which one or more batteries are mounted, and wherein the PCB comprises a second PCB.

6. The tire pressure monitor system of claim 5, further comprising one or more wires that connect the first PCB to the second PCB.

7. The tire pressure monitor system of claim 1, further comprising an electronics unit and an antenna mounted on the PCB.

8. The tire pressure monitor system of claim 7, wherein the electronics unit includes at least a transmitter, wherein the transmitter is configured to use the antenna to transmit the detected applied pressure.

9. The tire pressure monitor system of claim 7, wherein the electronics unit includes an accelerometer.

10. The tire pressure monitor system of claim 1, further comprising a pair of openings in the PCB, wherein a first opening in the pair of openings is used to receive the liquid and a second opening in the pair of openings is used to release air as the liquid is introduced.

11. The tire pressure monitor system of claim 10, further comprising a pair of plugs that seal the pair of openings to form the sealed pressure chamber.

12. The tire pressure monitor system of claim 1, wherein a depth of the sealed pressure chamber varies along its cross-section.

13. The tire pressure monitor system of claim 1, wherein a first end of the PCB is mounted to a bottom surface of a housing of the tire pressure monitor and a second end of the PCB is mounted to a top surface of the housing such that the second end of the PCB is elevated off of the bottom of the housing of the tire pressure monitor.

14. The tire pressure monitor system of claim 13, wherein an antenna is mounted at the second end of the PCB such that the antenna is also elevated off of the bottom of the housing of the tire pressure monitor.

15. A method of forming a tire pressure monitor, the method comprising:
   mounting a base of a chamber to a printed circuit board (PCB) such that the base is positioned over a first opening and a second opening in the PCB, wherein the base includes a pressure sensor;
   placing a liquid into the chamber via at least the first opening in the PCB;
   sealing the first opening and the second opening in the PCB to form a sealed pressure chamber; and
   mounting a piston adjacent to the sealed pressure chamber such that the piston contacts an exterior surface of the sealed pressure chamber in response to an applied pressure on the piston.

16. The method of claim 15, further comprising forming a housing that includes a battery portion, a sensor portion, and a mounting portion positioned in between the battery portion and the sensor portion.

17. The method of claim 16, further comprising mounting the PCB within the sensor portion of the housing such that a first end of the PCB is mounted to a bottom wall of the housing and a second end of the PCB is mounted to a top wall of the housing so that the second end is elevated off of the bottom wall of the housing.

18. The method of claim 17, further comprising mounting an antenna on the second end of the PCB such that the antenna is elevated off of the bottom wall of the housing.

19. The method of claim 16, wherein forming the housing comprises forming a bottom wall of the housing to have a curvature that matches a curvature of a rim to which the tire pressure monitor is to be mounted.

20. The method of claim 16, wherein forming the housing comprises forming an opening in the mounting portion that is configured to receive a valve stem from a tire.

\* \* \* \* \*